Aug. 10, 1926.  1,595,197

L. JAENICHEN ET AL

SCALE

Filed May 26, 1922   6 Sheets-Sheet 1

Inventors
Louis Jaenichen
John C. Mathews
By Edward N. Pagelsen
ATTORNEY.

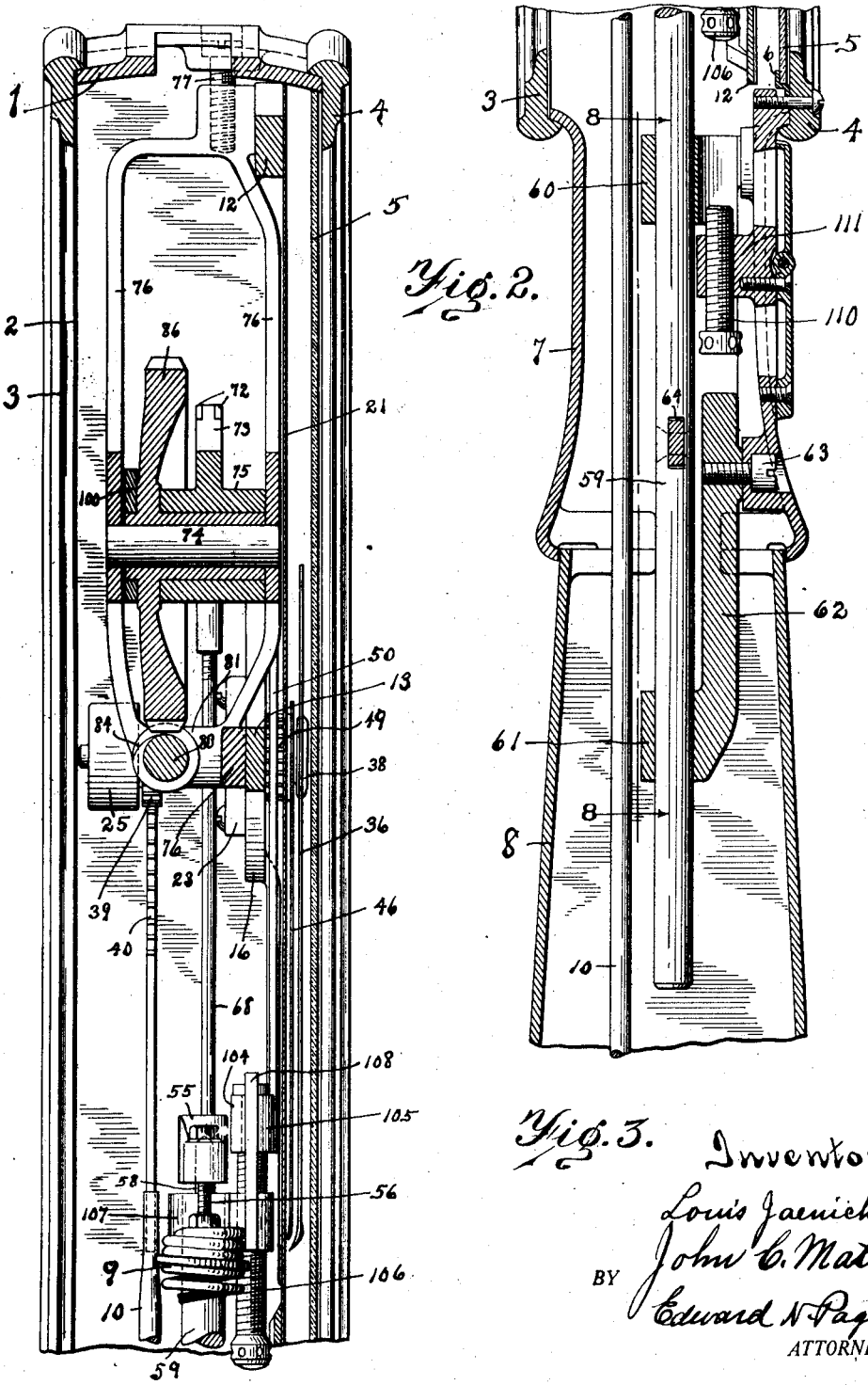

Aug. 10, 1926.　　　　　　　　　　　　　　　1,595,197
L. JAENICHEN ET AL
SCALE
Filed May 26, 1922　　　　6 Sheets-Sheet 4

Fig. 7.

Fig. 6.

Inventors
Louis Jaenichen
John C. Matheson
By Edward N. Pagelsen
ATTORNEY.

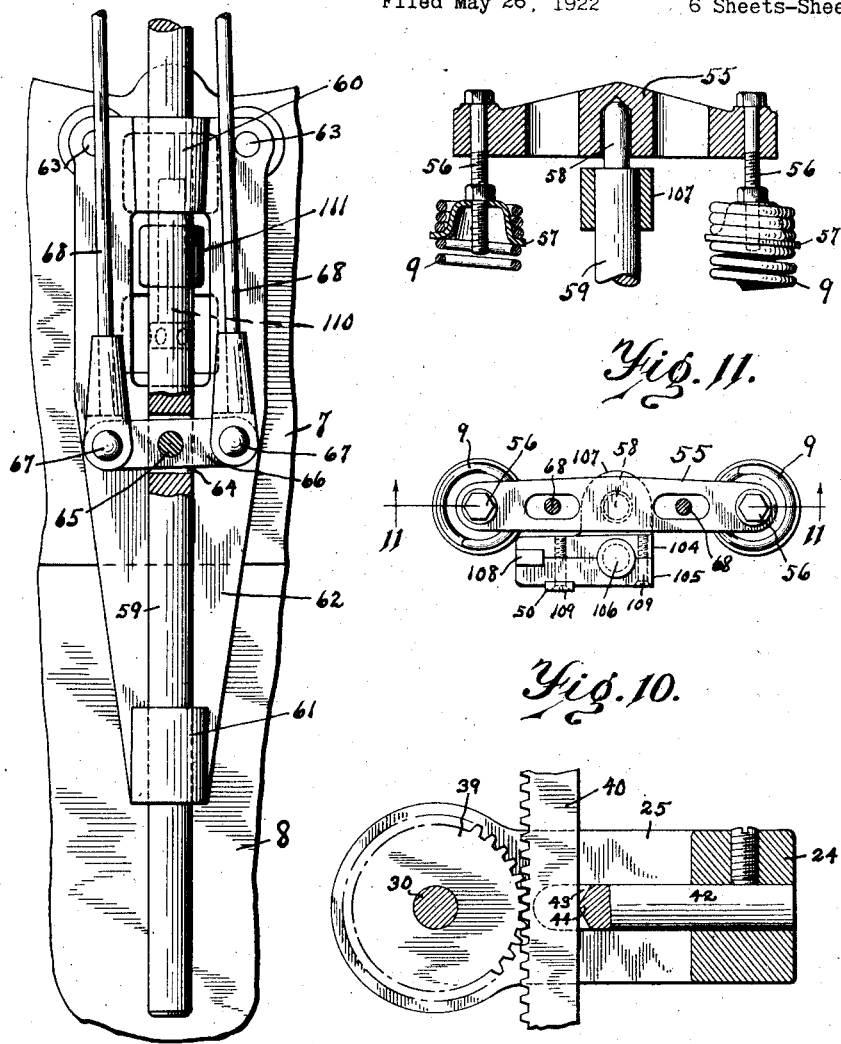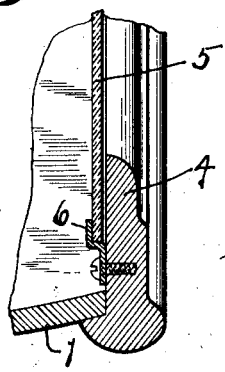

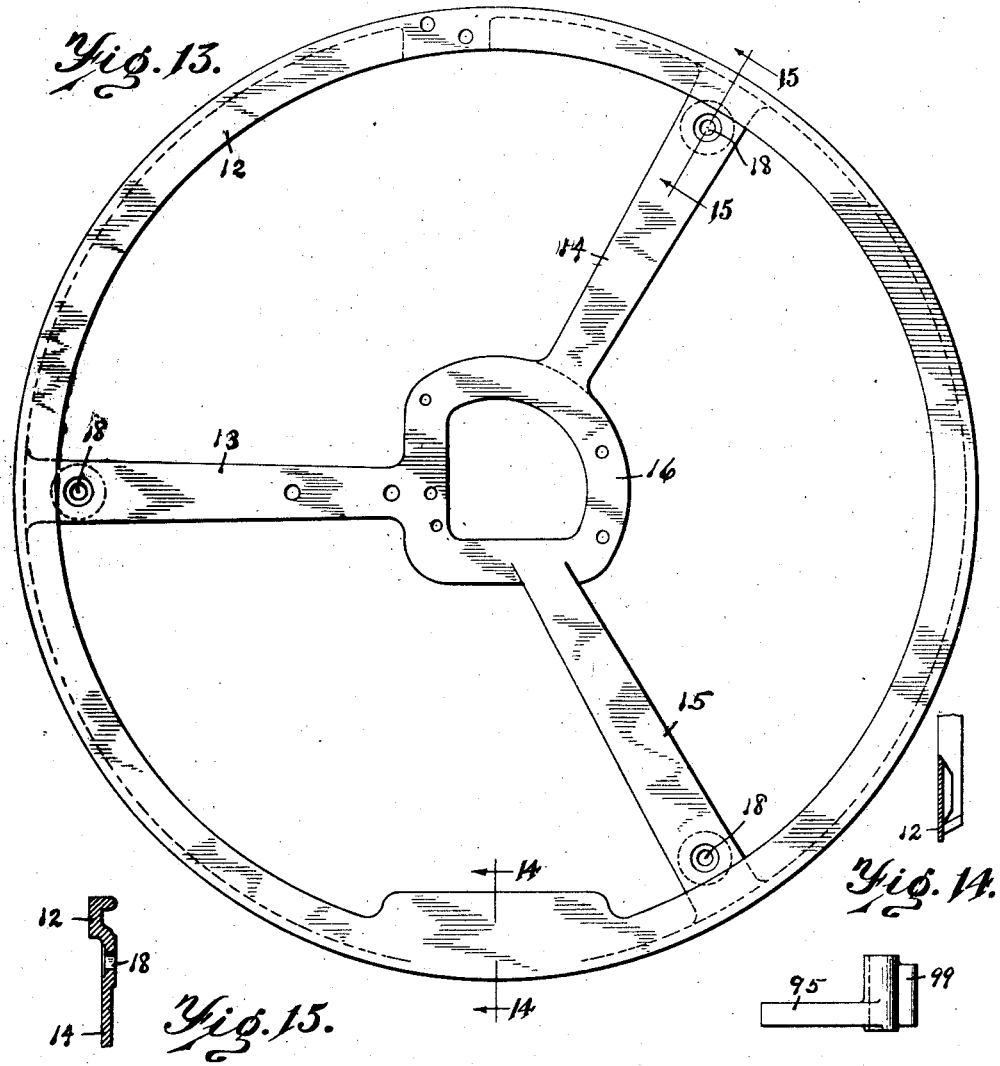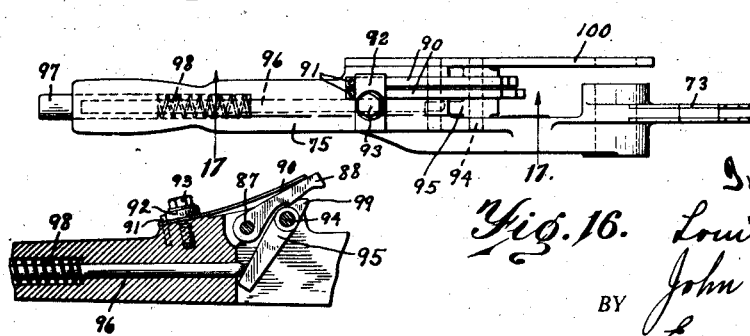

Patented Aug. 10, 1926.

1,595,197

UNITED STATES PATENT OFFICE.

LOUIS JAENICHEN AND JOHN C. MATHEWS, OF DETROIT, MICHIGAN, ASSIGNORS TO THE STANDARD COMPUTING SCALE COMPANY, OF DETROIT, MICHIGAN, A CORPORATION OF MICHIGAN.

SCALE.

Application filed May 26, 1922. Serial No. 563,799.

This invention relates to spring scales provided with upright indicating mechanisms which are moved consecutive distances for each increase of load on the load-receiving portions of the scales, and its object is to provide a scale of this character with movable supporting mechainsm for the load resisting springs so constructed that after a container or a load receiver has been placed on the scale the load resisting springs may be elevated bodily to return the weight indicator back to zero position while at the same time a tare indicator is moved from zero a distance equal to that through which the weight indicator has been returned.

This invention consists in combination with a weight indicator and resilient load-resisting means, of a tare indicator connected to the load-resisting means, and means to change the position of the load-resisting means to move the weight indicator in one direction and the tare indicator in the opposite direction.

It further consists in weight and tare indicators concentrically mounted so as to travel over the same circular chart.

It also consists in an operating arm to lift the load-resisting means and means whereby the arm may be accurately positioned and its movement indicated.

It also consists in the details of construction illustrated in the accompanying drawings and particularly pointed out in the claims.

Figure 1:
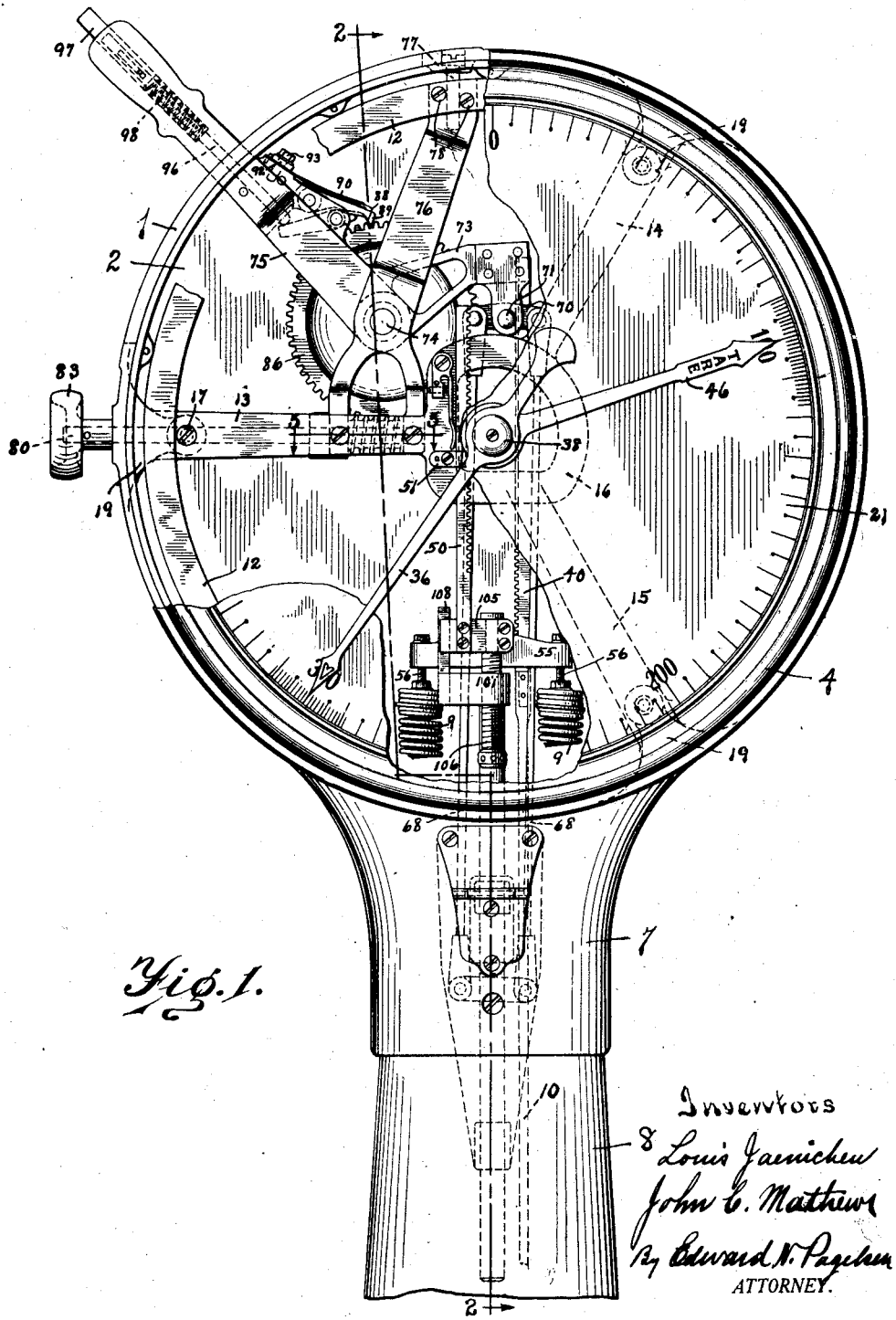
Figure 4:
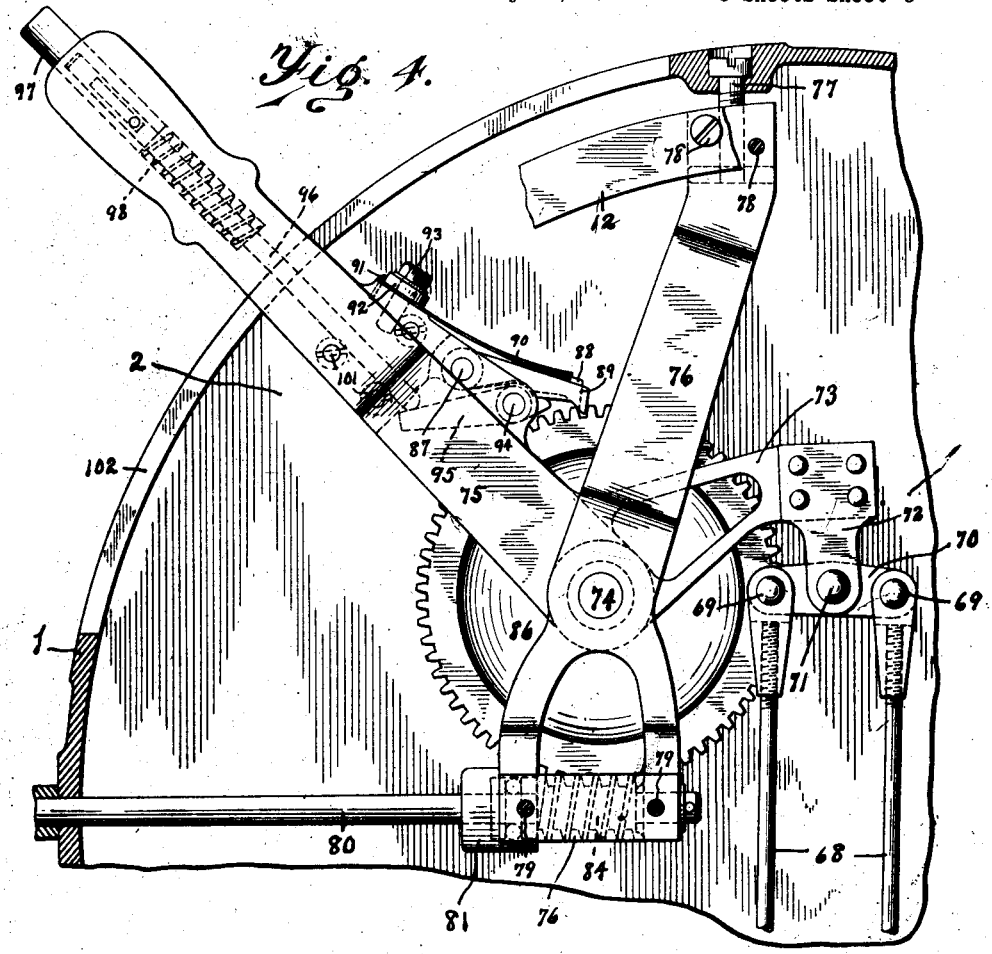
Figure 5:
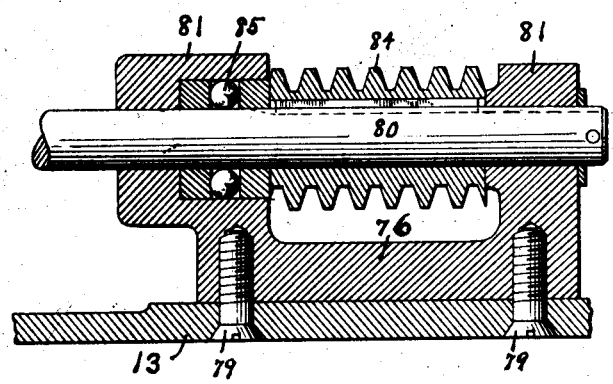

In the accompanying drawings, Fig. 1 is a front elevation of the upper portion of a scale embodying our invention. Figs. 2 and 3 are together a section on the line 2—2 of Fig. 1 on a larger scale. Fig. 4 is a front elevation of the adjustable spring support. Fig. 5 is a central longitudinal section of the adjusting worm on the line 5—5 of Fig. 1. Fig. 6 is a front elevation of the support for the indicators. Fig. 7 is a section on the line 7—7 of Fig. 6. Fig. 8 is an elevation on the line 8—8 of Fig. 3. Fig. 9 is a section on the line 9—9 of Fig. 7. Fig. 10 is a plan of the cross bar to which the upper ends of the springs are connected. Fig. 11 is a section on the line 11—11 of Fig. 10. Fig. 12 is a section across the front edge of the case for the indicating mechanism. Fig. 13 is an elevation of a spider to support the indicators. Figs. 14 and 15 are sections on the lines 14—14 and 15—15 of Fig. 13. Fig. 16 is an elevation of the spring-lifter lever. Fig. 17 is a section on the line 17—17 of Fig. 16. Fig. 18 is a plan of a releasing dog.

Similar reference characters refer to like parts throughout the several views.

The construction shown in Fig. 1 embodies a substantially cylindrical case 1 having a flat back 2 reinforced by a circumferential ring 3 shown in Figs. 2 and 3, and having a ring 4 at its front edge which carries a circular pane 5 of glass, held in position by occasional clips 6, as shown in Fig. 12. The case 1 has a neck 7, which in turn rests on the pedestal 8 of any desired height. This pedestal rests on a base which is not shown, but within which are the usual scale levers which connect to the weight resisting springs 9 and to the weight indicator rod 10 of well known construction and which form no part of the present invention. It may be said that in this scale as in many others, the rod 10 moves up and down with the lower ends of the springs.

Mounted within the case is a spider shown in Fig. 13, having a ring 12, arms 13, 14 and 15, and a hub 16. Screws 17 extend through holes 18 in these arms and through similar holes in brackets 19 extending inward from the case 1 and shown in dotted lines in Fig. 1. A dial 21 is attached to this ring 12 and has a central hole for the hub of the tare indicator.

Referring now to Figs. 6 and 7, which show the hub 16 of the spider and the indicating mechanism, a frame is secured to this hub by means of screws 22 and consists of a front cross bar 23, a post 24 and an arm 25 which carries the adjustable bearing rings 26 and 27 and balls 28 for the collar 29 on the rear end of the weight-indicator shaft 30. Rings 31 and 32 and balls 33 support the front collar 34 on this shaft which supports a third collar 35 to which the weight-indicating pointer 36 is secured by the screw 37 and washer 38. On this shaft is a pinion 39 engaged by the rack bar 40 whose lower end connects to the rod 10. In order to keep the rack bar in mesh with the pinion, a guide pin 42 is mounted in the post 24, as shown in Figs. 7 and 9, and has a slot 43 in which the rack bar is guided and a pointed supporting lug 44. This rack bar moves up and down with the load receiving parts of the scale, that is, with the lower ends of the springs 9.

A tare indicating pointer 46 is secured to a sleeve 47 which is rotatable on the hub 48 on the cross bar 23. This sleeve 47 has spur teeth 49 which mesh with a rack bar 50 which is guided by the clip 51 and held in engagement with the teeth 49 by means of a spring arm 52, whose tension is adjustable by means of a screw 53. This rack bar connects to the support for the load supporting springs and the mechanism hereinafter described has for its purpose to raise the supporting device for the springs sufficiently to carry the weight-indicating pointer back to zero after the load container has been placed on the scale in order to deduct the tare. The rack bars 40 and 50 are substantially parallel to each other and engage opposite sides of the pinions.

The force of the load is transmitted to the lower ends of the springs 9 in any desired manner and these springs are connected to the ends of a cross bar 55 by means of the bolts 56 and cupped washers 57 on which the springs are adjustably mounted. This cross bar rests on a pivot 58 at the upper end of a vertically slidable rod 59 carried by the guides 60 and 61 attached to the plate 62 which is secured to the front of the neck 7 in any desired manner, screws 63 being shown.

Extending through a slot 64 in this slidable rod 59 and mounted on the pin 65 is a bar 66 having pins 67 in its ends to which the links 68 attach. These links connect at their upper ends (Fig. 4) to the pins 69 in the end of the bar 70 mounted on the pin 71 carried by a plate 72 at the end of the arm 73 of a bell-crank lever whose other arm 75 is the tare-control arm of the scale. Swinging the arm 75 down toward horizontal position lifts the cross bar 55 which supports the springs and with them the whole weight supporting and indicating system.

The arm 75 is mounted on a pin 74 carried by a double brace 76 which extends down from the top of the case to which it is secured by the screw 77. It is also secured to the ring 12 by screws 78. Its lower end is attached to the spider arm 13 by screws 79 and this lower end is formed with lugs 81 to receive the shaft 80.

On the outer end of this shaft 80 is a hand wheel or button 83 by means of which this shaft and the worm 84 thereon may be turned. As the thrust on this worm is always in one direction, one roller bearing 85 will be found sufficient. This worm meshes with the worm wheel 86 which is loose on the shaft 74.

The arm 75 carries a pin 87 on which two pawls 88 and 89 are mounted and these pawls are pressed against the teeth of the worm wheel 86 by the springs 90, mounted on the pins 91 (Fig. 16) and held in position by a plate 92 and screw 93. One of these pawls is preferably one half the pitch of the teeth of the worm wheel longer than the other. A pin 94 on this arm 75 carries a small dog 95 whose long arm is adapted to be engaged by the rod 96, slidable in this arm 75. This rod is forced down by the hand of the operator pressing on the cylindrical cap 97 which is normally held out by the spring 98. When this rod 96 is pushed in, the nose 99 on the dog lifts up both pawls 88 and 89 from engagement with the worm wheel teeth. A plate 100 is secured to the arm 75 by means of screws 101 and extends on the rear side of the worm wheel. The case 1 is formed with a circumferential slot 102 to permit this arm 75 to swing.

The rack bar 50 for operating the tare indicator 46 is attached to a small block formed of two parts 104 and 105 (Fig. 10) which is rotatably mounted on the reduced upper end of a screw 106 carried by a block 107 attached to the upper end of the rod 59 just below the cross bar 55. This block 107 also carries a small guide bar 108 which extends between the two parts 104 and 105 and prevents them and the rack bar 50 from twisting. The screws 109 secure these two parts and the rack bar 50 together. Turning this screw 106 in either direction causes the rack bars 40 and 50 to move relative to each other as the "weight" rack bar 40 connects to the lever system and therefore to the springs 9, equalizer 55 and block 107, while the "tare" rack bar 50 connects to the parts 104 and 105 which are journaled on the screw 106 and do not move longitudinally thereof when this screw is turned to move up or down relative to the block 107 and the "weight" rack bar.

A screw 110 is mounted in a stationary threaded boss 111 on the pedestal and when the arm 75 is released and swung up to normal position, the screw 106 rests on this screw 110. When the screw 110 is turned, the screw 106 and the tare rack bar 50 move up or down so that the tare indicator 36 may be "set to zero" on the chart. When the screw 106 is turned, the block 107 and the equalizer 55 and all the parts connected thereto are moved up or down and the weight indicator thereby set to zero. The tare indicator is therefore first set to zero and thereafter the weight indicator.

When the scale is properly adjusted and empty, the two indicating hands 36 and 46 should be at zero. When an empty box, case or other standard container, or truck or barrow, is placed on the scale, the hand 36 will indicate its weight, but the tare hand 46 will remain stationary at zero. The operator, while the container remains on the scale, then swings down the arm 75, the pawls 88 and 89 riding over the teeth of the worm wheel, and he thereby lifts the rod 59, the cross bar 55, the springs 9 and the parts connected to the lower ends thereof, including the rack bar 40, until the weight hand 36 again points to zero. This movement of the lever 75 lifts the rod 59 and with it the block 107, the screw 106, the two parts 104 and 105 and the tare rack bar 50 and swings the tare pointer 46 in the opposite direction to the movement of the pointer 36 but to the same extent, so that the tare pointer 46 will now indicate the weight of the container on the scale, that is, the tare.

When articles to be weighed are now placed in the container, the hand 36 will move and indicate the net weight thereof, but the tare indicator will remain stationary and continue to indicate the tare weight of the container.

It is evident that this scale is as adapted for ordinary weighing as any other standard scale, for when the tare hand is at zero, the total weight of any load placed on the scale is indicated by the weight hand 36. The tare mechanism remains idle unless the arm 75 is swung down.

Attention is called to the fact that the weight indicating mechanism has no connection whatever with the tare indicator and its operating mechanism and that therefore no additional friction results from this additional tare mechanism. One is entirely independent of the other in its operation. The friction of the tare mechanism is overcome by a manually operated lever and is therefore absolutely immaterial so far as the accuracy of the scale is concerned.

It is evident that the teeth of the worm wheel 86 are not sufficiently numerous for accurate adjustment when using only the pawls 88. The operator therefore moves the arm 75 until the pointer 36 is about at zero, and then turns the knob 83 to turn the worm wheel either way as required and swing the arm 75 until the pointer 36 is absolutely at zero.

The amount of tare which can be taken care of by this mechanism is virtually the total capacity of the scale, so long as the several parts are so proportioned as to lift the upper ends of the springs sufficiently for this purpose. This tare can be changed almost instantly and has no effect on the weighing capacity of the scale, that is, it has no effect on its accuracy.

The zero adjusting mechanism is not a part of this joint invention, being the sole invention of John C. Mathews, and will be the subject matter of a separate application.

The details of construction and the proportions of the parts may all be changed by skilled scale makers without departing from the spirit of our invention as set forth in the following claims.

We claim:—

1. In a scale, a circular graduated chart, a weight indicator and a tare indicator mounted to turn over the chart on a common axis, weight resisting means adapted to yield in proportion to the weight on the scale and an operative connection between one end thereof and the weight indicator, a movable support for the opposite end of the weight resisting means, and an operative connection between the support and the tare indicator.

2. In a scale, a circular graduated chart, a weight indicator and a tare indicator mounted to turn over the chart on a common axis, weight resisting means adapted to yield according to the weight on the scale and an operating connection between one end thereof and the weight indicator, a movable support for the opposite end of said weight resisting means, an operative connection between the support and the tare indicator, and manually operable means to position the support.

3. In a scale, a circular graduated chart, a weight indicator and a tare indicator mounted to turn over the chart on a common axis, weight resisting means adapted to yield according to the weight on the scale and an operating connection between one end thereof and the weight indicator, a movable support for the opposite end of said weight resisting means, an operative connection between the support and the tare indicator, a manually operable arm adapted to position the support, means to hold the arm, and manually operable means to adjust the arm-holding means.

4. In a scale, a circular graduated chart, a weight indicator and a tare indicator mounted to turn over the chart on a common axis, weight resisting means adapted to yield according to the weight on the scale and an operating connection between one end thereof and the weight indicator, a movable support for the opposite end of said weight resisting means, an operative connection between the support and the tare indicator, a vertically movable bar on which the support is mounted, and means to adjust the position of the bar.

5. In a scale, a circular graduated chart, a weight indicator and a tare indicator mounted to turn over the chart on a common axis, weight resisting means adapted to yield according to the weight on the scale and an operating connection between one end thereof and the weight indicator, a movable support for the opposite end of said weight resisting means, an operative connection between the support and the tare indicator, a vertically movable rod on which the support is mounted, a pivoted lever adapted to be manually operated, and links connecting the lever and the bar.

6. In a scale, a graduated chart, a weight indicator and a tare indicator mounted adjacent the chart, weight resisting means adapted to yield according to the weight on the scale, a movable support therefor, and connections between the weight resisting means and said indicators to cause them to move in opposite directions relative to the chart as the weight resisting means is shifted as a whole.

7. In a scale, a weight indicator and a tare indicator, weight resisting springs and a support therefor, means operatively connecting said support to the tare indicator, a lever pivoted adjacent said support, means connecting one arm of the lever to said support whereby the support may be raised and lowered, a toothed abutment adjacent the lever, means on the lever to engage the abutment, and adjustable means to position the abutment.

8. In a scale, a graduated chart, a weight indicator and a tare indicator mounted adjacent the chart, weight resisting means adapted to yield according to the weight on the scale, a movable support therefor, a lever to raise and lower said support, a toothed wheel adjacent the lever, a pawl on the lever to engage the toothed wheel to hold the lever and support in a series of different positions, and means to turn the toothed wheel to vary the position of the lever and support, and means connecting the tare indicator to said support.

9. In a scale, a graduated chart, pivoted weight and tare indicators, a pinion connected to each indicator, a rack bar for actuating each indicator and engaging said pinions, a weight resisting mechanism adapted to yield according to the weight on the scale and a support therefor to which is connected the rack bar for actuating the tare indicator, and means to position said support, said rack bars extending substantially parallel to each other and engaging opposite sides of said pinions.

10. In a scale, a weight indicator and a tare indicator, load resisting means and a movable support therefor, connections between the weight resisting means and the weight indicator and between the movable support and the tare indicator, manually operable means to raise and lower said support, and means to determine the final position of said manually operable means.

11. In a scale, a graduated chart, pivoted weight and tare indicators, a pinion connected to each indicator, a rack bar for actuating each indicator and engaging said pinions, a weight resisting mechanism adapted to yield according to the weight on the scale and a support therefor to which is connected the rack bar for actuating the tare indicator, means to position said support, said rack bars extending substantially parallel to each other and engaging opposite sides of said pinions, and means to cause the weight indicator rack bar to move up and down with the lower ends of the springs.

12. In a scale, a graduated chart, pivoted weight and tare indicators, a pinion connected to each indicator, a rack bar for actuating each indicator and engaging said pinions, a weight resisting mechanism adapted to yield according to the weight on the scale and a support therefor to which is connected the rack bar for actuating the tare indicator, means to position said support, said rack bars extending substantially parallel to each other and engaging opposite sides of said pinions, and means to cause the weight indicator rack bar to move up and down with the lower ends of the springs, said rack bars engaging opposite sides of said pinions so that a bodily movement of the springs causes the indicators to turn in opposite directions.

LOUIS JAENICHEN.
JOHN C. MATHEWS.